(12) United States Patent
Aoki

(10) Patent No.: US 6,507,558 B2
(45) Date of Patent: Jan. 14, 2003

(54) OPTICAL DISC HAVING FORMAT SUITABLE FOR LARGE AMOUNT OF DATA AND METHOD OF MAKING THE SAME

(75) Inventor: Ikuo Aoki, Yokohama (JP)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/815,299

(22) Filed: Mar. 23, 2001

(65) Prior Publication Data

US 2001/0040861 A1 Nov. 15, 2001

(30) Foreign Application Priority Data

Mar. 24, 2000 (JP) .......................... 2000-085201

(51) Int. Cl.[7] ................................. G11B 7/24
(52) U.S. Cl. ................... 369/275.3; 369/59.2
(58) Field of Search ................. 369/275.3, 59.2, 369/275.4

(56) References Cited

U.S. PATENT DOCUMENTS 4,229,808 A * 10/1980 Hui .......................... 369/53.14

OTHER PUBLICATIONS

2002/003770A!—published applications, Jan. 2002.*

* cited by examiner

*Primary Examiner*—Aristotelis M. Psitos
(74) *Attorney, Agent, or Firm*—Staas & Halsey LLP

(57) ABSTRACT

In an optical disc having tracks for recording user data such as a rewritable type optical disc using a phase change medium or a magneto-optical medium, or a write-once type optical disc using a pigment based medium, a wobble portion waved in a radial direction of the optical disc and a non wobble portion which is not waved are provided on the tracks, sub information which is data other than the user data is recorded on the tracks by using a combination of the wobble portion and the non wobble portion, a logic value of each bit is represented by a pair of the wobble portion and the non wobble portion, and the phase of wave in the wobble portion when a bit is a logical value of "0" and the phase of wave in the wobble portion when a bit is a logical value of "1" are different.

53 Claims, 9 Drawing Sheets

| <INPUT> SUB INFORMATION DATA BIT | <OUTPUT> CONVERTED SUB INFORMATION DATA BIT |
|---|---|
| 0 0 | 0 1 0 1 |
| 0 1 | 1 1 0 0 |
| 1 0 | 0 0 1 1 |
| 1 1 | 1 0 1 0 |

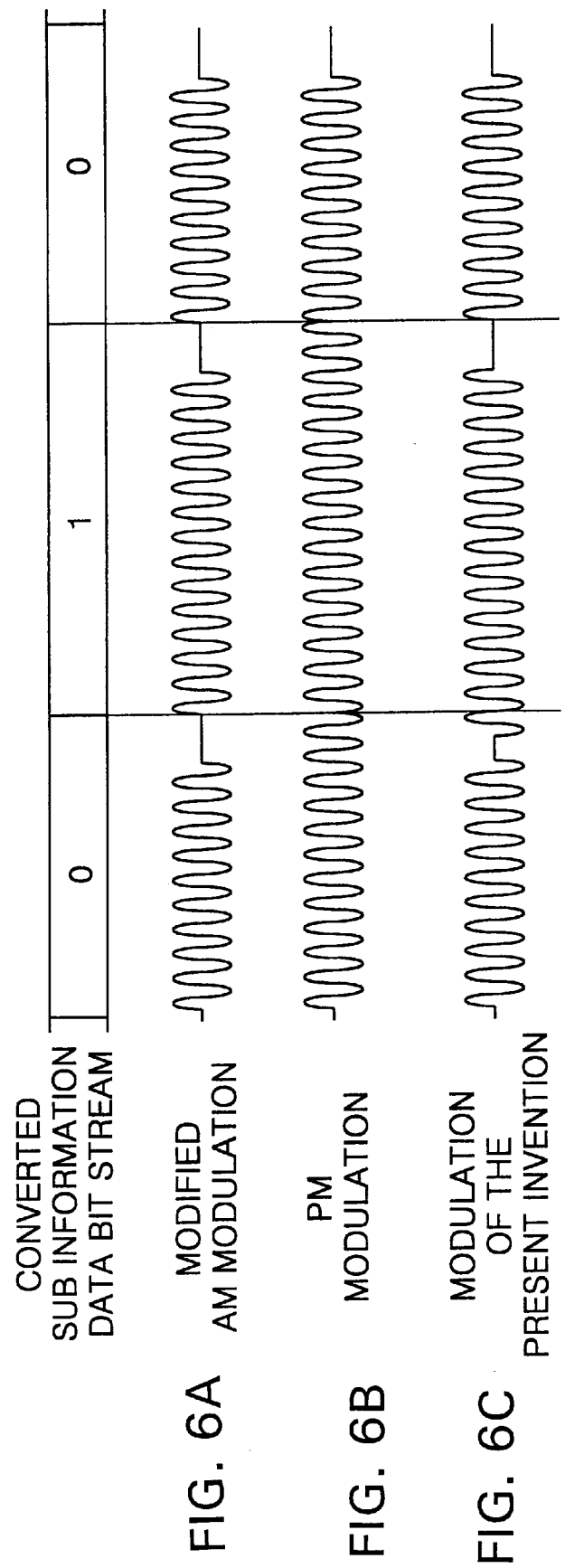

<EXAMPLE 1>

TOTAL WOBBLE PERIOD LENGTH
= 8·(10+2)+8·(14+2)
= 224

<EXAMPLE 2>

TOTAL WOBBLE PERIOD LENGTH
= 8·(10+2)+8·(14+2)
= 224

OPTICAL DISC HAVING FORMAT SUITABLE FOR LARGE AMOUNT OF DATA AND METHOD OF MAKING THE SAME

CROSS REFERENCE TO RELATED APPLICATIONS

This application claims the benefit of Japanese Patent Application No. 00-85201 filed Mar. 24, 2000, the disclosure of which is incorporated herein by reference.

BACKGROUND OF THE INVENTION

1. Field of the Invention

The present invention relates to the physical format of a rewritable type optical disc using a phase change medium or a magneto-optical medium, or a write-once type optical disc using a pigment based medium, and more particularly, to the physical format suitable for a large amount of data such as video data or audio data and a method of making the same.

2. Description of the Related Art

As a storage medium having a large capacity used for a computer, DVDs (digital video discs), MO (magneto-optical) discs or CDs (compact discs) are commercially manufactured as products. Also, with the wide-spread and expanding use of computers, a user's requirements to change data stored in a storing medium such that the need for a storage medium capable of changing or writing once data is rapidly increasing.

As a rewritable type storing medium which enables a user to change data multiple times, there is a DVD-RAM (random access memory) using a phase change medium, an MO disc using an MO medium, and a CD-RW (rewritable) disc. Also, there is a CD-R using a pigment based medium as a write-once type storage medium in which a user can write data only one time. An address for recognizing the position where data is recorded is also stored in each of these storage media.

An ID (identification) portion for indicating the address is provided on the DVD-RAM or MO disc separately from a portion where user data is stored.

Also, a wobble address method using an FM (frequency) modulation is used to manage the address in the CD-RW or CD-R disc. Here, wobble means a wave type track indicating a structure that a track on a disc waves in a radial direction. That is, in the CD-RW or CD-R disc, the address is recorded by changing the frequency of the wobble (wave form) of the track. Thus, the user data and the address are recorded together along the track on the CD-RW or CD-R disc.

However, the conventional technology has the following problems. For example, since the ID portion is needed in the DVD-RAM or MO disc in addition to the area where the user data is recorded, an efficiency in use of a disc surface area is deteriorated.

Further, in the conventional technology since the structure of the disc surface is different in the areas where the user data is recorded and in the ID portion, a process to manufacture such discs is complicated. In particular, since the ID portion is arranged in a zigzag in the DVD-RAM disc, the manufacturing process is more complicated.

Another problem that arises is that since the address corresponds to the frequency of the wobble in the CD-RW or CD-R, a disc reproduction apparatus needs to read a signal (wobble) having a different frequency to read the address, requiring the structure of the reproduction apparatus to be complicated.

Yet another problem that arises with conventional technology is that since the frequency of the wobble of the track is changed according to an address value, the length of the track needed to represent the address changes according to the address value. Thus, the control of data recording is complicated.

Further, since the method of matching the address to the frequency of the wobble in conventional technology is one in which the address is stored by FM-modulating the wobble, the required C/N (carrier to noise) ratio is relatively high so that reliability in recording/reproduction is deteriorated.

SUMMARY OF THE INVENTION

Accordingly, it is an object of the present invention to provide an optical disc in which an efficiency in use of a disc surface area is high, manufacturing of discs is made easy, the structure of a disc reproducing apparatus is simplified, control of data recording on a disc is simplified, and the required C/N ratio is low, so that reliability in recording/reproduction is improved.

Additional objects and advantages of the invention will be set forth in part in the description which follows and, in part, will be obvious from the description, or may be learned by practice of the invention.

The foregoing objects of the present invention are achieved by providing an optical disc having tracks for recording user data such as a rewritable type optical disc using a phase change medium or a magneto-optical medium, or a write-once type optical disc using a pigment based medium, in which a wobble portion waved in a radial direction of the optical disc and a non wobble portion which is not waved are provided on the tracks, sub information which is data other than the user data is recorded on the tracks by using a combination of the wobble portion and the non wobble portion, a logical value of each bit is represented by a pair of the wobble portion and the non wobble portion, and the phase of wave in the wobble portion when a bit is a logic value of "0" and the phase of wave in the wobble portion when a bit is a logic value of "1" are different.

It is a further object of the present invention that the length of one of the wobble portion and the non wobble portion is different when a bit is a logical value of "0" and a logical value of "1."

It is yet a further object of the present invention that the sub information is an address of the track.

It is yet a further object of the present invention that the difference between the phase of wave in the wobble portion in the case in which a bit is a logic value of "0" and the phase of wave in the wobble portion in the case in which a bit is a logic value of "1" is set to be about 180°.

It is yet a further object of the present invention that, at transition points from the wobble portion to the non wobble portion and from the non wobble portion to the wobble portion, the phase of wave in the wobble portion is set to a predetermined phase.

It is yet a further object of the present invention that the lengths of the wobble portion and the non wobble portion are set to integer multiples of one period of wave in the wobble portion.

It is yet a further object of the present invention that each of the tracks is divided into a plurality of zones in a radial direction of the optical disc.

It is yet a further object of the present invention that the sub information is a zone address of the zone.

It is yet a further object of the present invention that the phases of waves of the wobble portions of adjacent tracks in the zone are consistent.

BRIEF DESCRIPTION OF THE DRAWINGS

These and other objects and advantages of the present invention will become apparent and more readily appreciated from the following description of the preferred embodiments, taken in conjunction with the accompanying drawings of which:

FIGS. 6A through 6C are waveform diagrams showing the comparison of waveforms obtained from wobbles according to an MAM (modified amplitude modulation) modulation, a PM (phase modulation) modulation, and a modulation method of the present invention;

DESCRIPTION OF THE PREFERRED EMBODIMENTS

Figure 1:
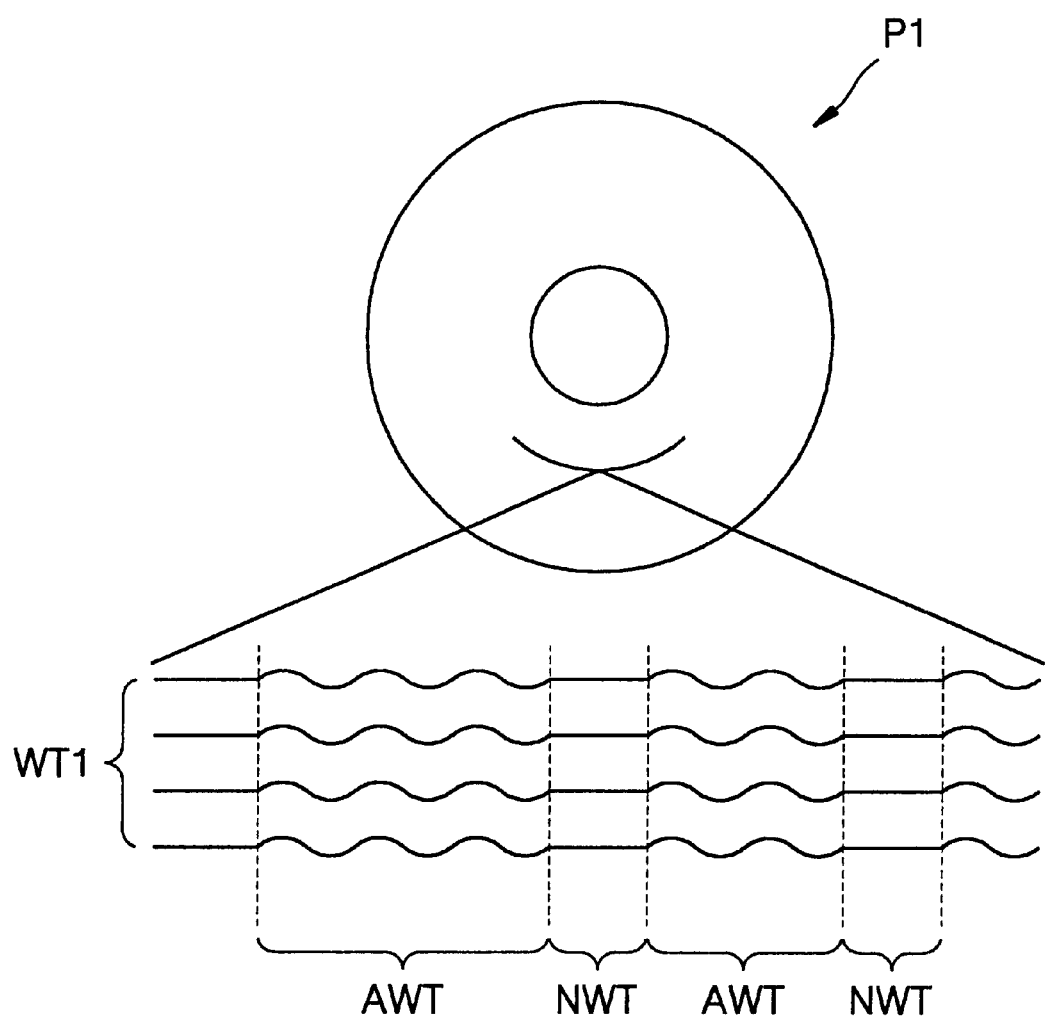
FIG. 1 is a view showing the structure of the optical disc P1 according to first an embodiment of the present invention.

Reference will now be made in detail to the preferred embodiments of the present invention, examples of which are illustrated in the accompanying drawings, wherein like reference numerals refer to like elements throughout. The embodiments are described below in order to explain the present invention by referring to the figures.

Referring to FIG. 1, a plurality of tracks are provided on the surface of an optical disc P1 according to an embodiment of the present invention. Sub information is previously recorded along the tracks. User data is recorded by being overlapped on the tracks where the sub information is recorded. Here, the sub information is information other than the user data, for example, an address. The sub information includes various parameter information concerning the disc.

Here, the optical disc P1 may be a rewritable type optical disc such as DVD-RAM or CD-RW discs using a phase change medium and MO discs using an MO medium, or a write-once type optical disc such as CD-R discs using a pigment based medium.

Wobble track WT1 is provided on the surface of the optical disc P1, as shown in the drawing so that user data is recorded along the wobble track WT1. Here, a wobble means a wave form and the track is formed to be waved in a radial direction of the optical disc P1. However, the wobble track WT1 has a wobble portion AWT that is wobbled and a non wobble portion NWT that is not wobbled. The sub information is recorded on the tracks by the combination of these wobble portions AWT and non wobble portions NWT.

Figure 2:
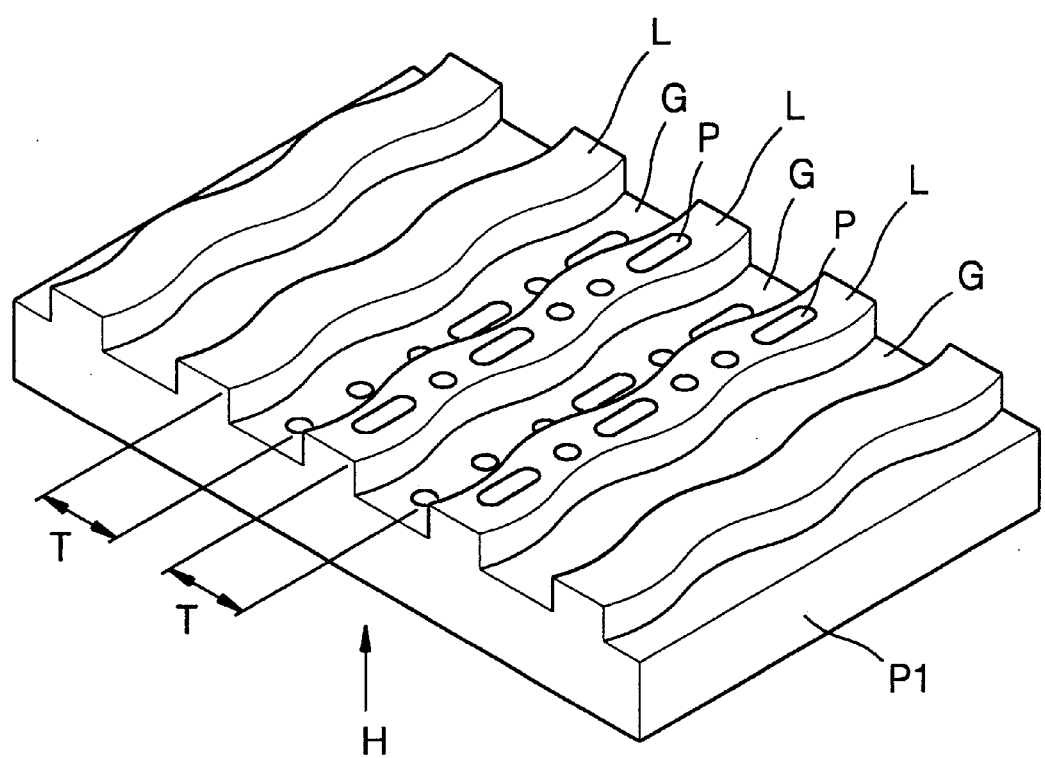
FIG. 2 is a magnified perspective view showing the structure of the wobble track WT1 formed on the surface of the optical disc P1 of the present invention.

FIG. 2 shows a detailed structure of the wobble track WT1 on the optical disc P1. A waved track recess T is provided on the surface of the optical disc P1. The floor of the track recess T is referred to as a groove G while a portion between the neighboring track recesses T is referred to as a land L. The waved portion of the track recess T is referred to as a wobble.

When user data is recorded on the optical disc P1 by using a land and a groove recording method, recording marks P are formed on both the land L and groove G. Also, when the recorded data is read, light H is input from the bottom surface of the optical disc P1.

The wobble (wave) of the track recess T is used to indicate sub information of the user data recorded on the optical disc P1. The sub information indicates addresses, that is, the position of the user data recorded along the track recess T. Thus, in the optical disc P1, the user data and the sub information are recorded by being overlapped along the track recess T.

Figures 3, 4:
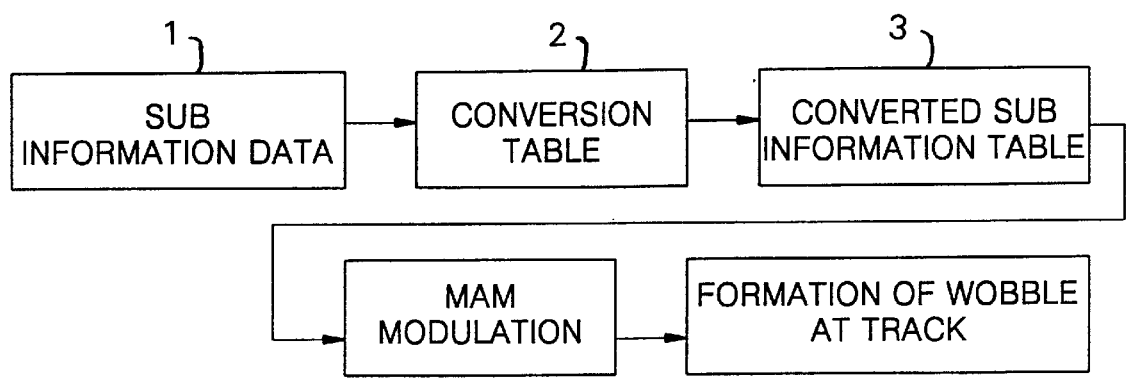
FIG. 3 is a block diagram showing the sequence of recording sub information on the wobble track.
FIG. 4 is an example of a conversion table of sub information data.

FIG. 3 shows the sequence of recording the sub information on the wobble of the track recess T, that is, forming the wobble track WT1 on the optical disc P1 based on the sub information data. First, sub information data 1 is converted to converted sub information data 3 by a conversion table 2. The converted sub information data 3 is MAM (modified amplitude modulation) modulated. A wobble is formed on the track recess T based on MAM modulated waveform data. Here, the MAM modulation means an improved MAM modulation applicable to the optical disc of the present invention.

FIG. 4 shows an example of the conversion table 2. As described above, the conversion table 2 receives the sub information data 1 as an input and outputs the converted sub information data. The sub information data 1 and the converted sub information data 3 are digital data formed of binary units "0" and "1."

According to the conversion table in FIG. 4, 2 bits sub information data is converted to 4 bits converted sub information data. The converted sub information data includes equal numbers of "0" and "1" at any event. That is, in the 4 bits converted sub information data, two bits are "0" and the other two bits are "1."

Figure 5A:
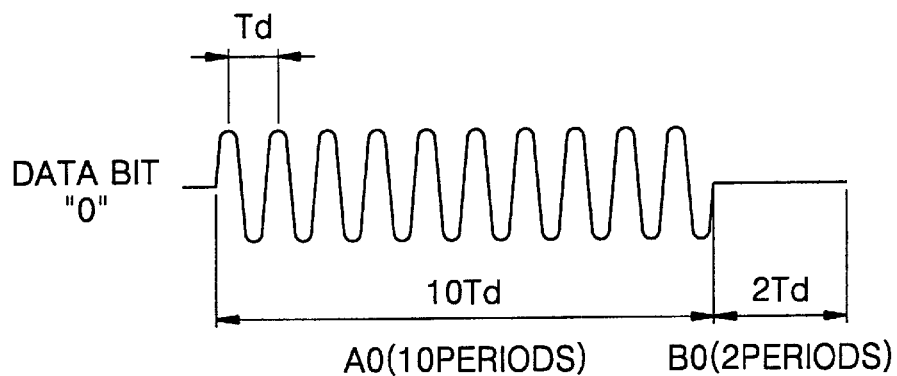
FIGS. 5A and 5B are waveform diagrams showing data bits "0" and "1" of the converted sub information data modulated by a modulation method of the present invention, respectively.
Figure 5B:
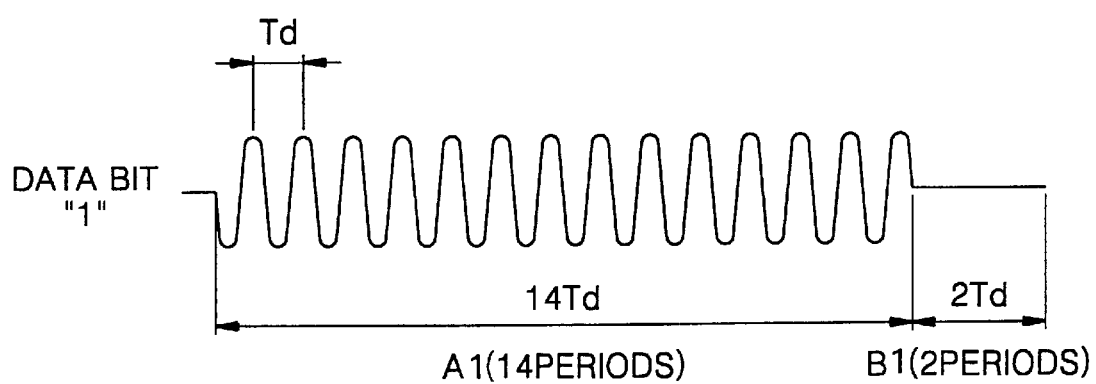

FIGS. 5A and 5B show examples of the modulation method according to the present invention. This modulation method is an MAM modulation mixed with a PM (phase modulation) modulation to be described later. By this modulation method, "0" included in the modulation sub information data is converted to a waveform in FIG. 5A while "1" included in the modulation sub information data is converted to a waveform in FIG. 5B.

A waveform corresponding to the converted sub information data "0" as shown in FIG. 5A is formed of a wobble section A0 having a wave of 10 periods and a non wobble section B0 which is not waved. The length of the non wobble section B0 is set to correspond to the length of wave equivalent to 2 periods in the wobble section A0. Also, the wave of period Td in the wobble section A0 is always uniform.

A waveform corresponding to the converted sub information data "1" as shown in FIG. 5B is formed of a wobble section Al having a wave of 14 periods and a non wobble section B1 which is not waved. The length of the non wobble section B1 is set to correspond to the length equivalent to 2 periods in the wobble section A1. Also, the period Td in the wobble section A1 is always uniform and is the same as the period Td of the wave included in the waveform corresponding to the converted sub information data "0." Thus, the length of the non wobble section B1 included,in the waveform corresponding to the converted sub information data "1" is the same as that of the non wobble section B0 included in the waveform corresponding to the converted sub information data "0." Thus, when the lengths of the A0, B0, A1 and B1 are represented by units of period Td of waves in common, (A0, B0)=(10, 2) and (A1, B1)=(14, 2).

Further, the phase of the wave in the wobble section A0 included in the waveform corresponding to the converted sub information data "0" as shown in FIG. 5A is shifted by 180° from the phase of the wave in the wobble section A1 included in the waveform corresponding to the converted sub information data "1" as shown in FIG. 5B. That is, the modulation method of the present invention is an MAM modulation mixed with the above phase modulation (PM modulation).

FIGS. 6A through 6C show the comparison of waveforms obtained from the wobbles by the MAM modulation, the PM modulation, and the present modulation method, that is, the MAM modulation mixed with the PM modulation. Here, FIG. 6A shows a waveform obtained from the wobble by the MAM modulation only, FIG. 6B shows a waveform obtained from the wobble by the PM modulation only, and FIG. 6C shows a waveform obtained from the wobble by the modulation of the present invention.

Figure 7A:
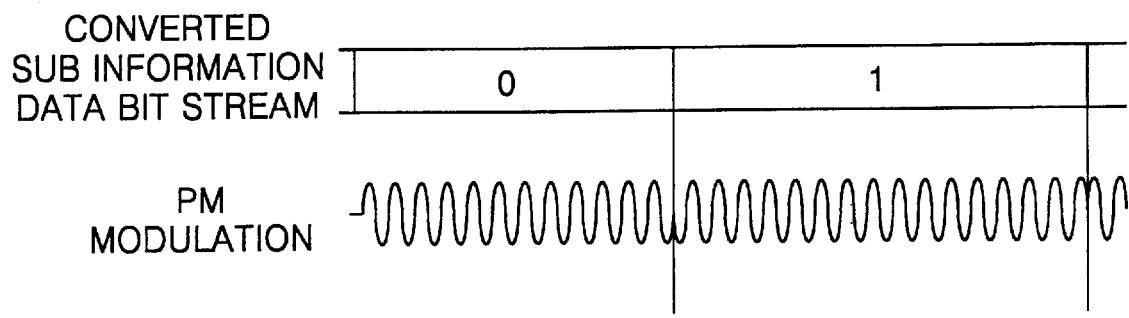
FIGS. 7A, 7B and 7C are views showing the point where the converted sub information data transits from "0" to "1" in the waveform obtained from the wobble according to the PM modulation.
Figure 7B:
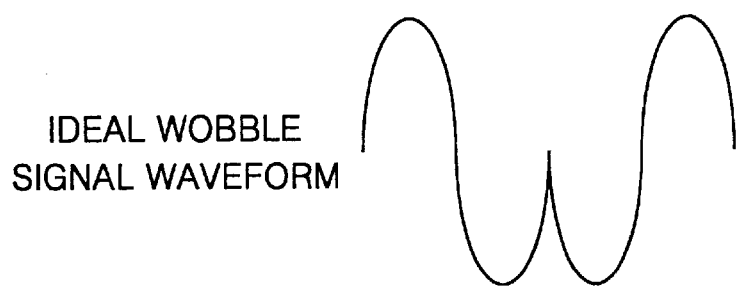
Figure 7C:
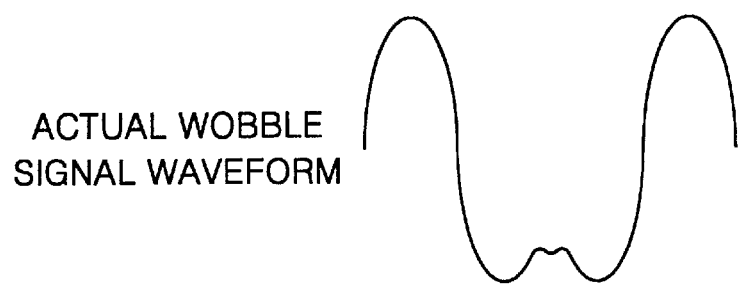

FIG. 7A shows a waveform obtained from the wobble by the PM modulation only and FIGS. 7B and 7C show enlarged waveforms of a point (A portion) where the converted sub information data transits from "0" to "1." Ideally, the waveform at the transition point should be a wobble signal waveform of FIG. 7B. But, actually, the waveform appears to be a distorted signal waveform of FIG. 7C due to noise caused by an optical disc, for example, noise caused by deformation of a wobble generated during a disc manufacturing process, noise (so called a disc noise) generated by roughness (minute unevenness) of the surface of the optical disc, and noise generated by a drive apparatus for recording/reproducing an optical disc. Thus, with the PM modulation only, errors may be generated in recording/reproducing an optical disc.

In contrast, according to the modulation method of the present invention, that is, the MAM modulation mixed with the PM modulation, since a non wobble portion is inserted between two neighboring wobble portions having different phases as shown in the waveform of FIG. 6C, the possibility of distortion of a signal waveform at the transition point is low.

Figure 8:
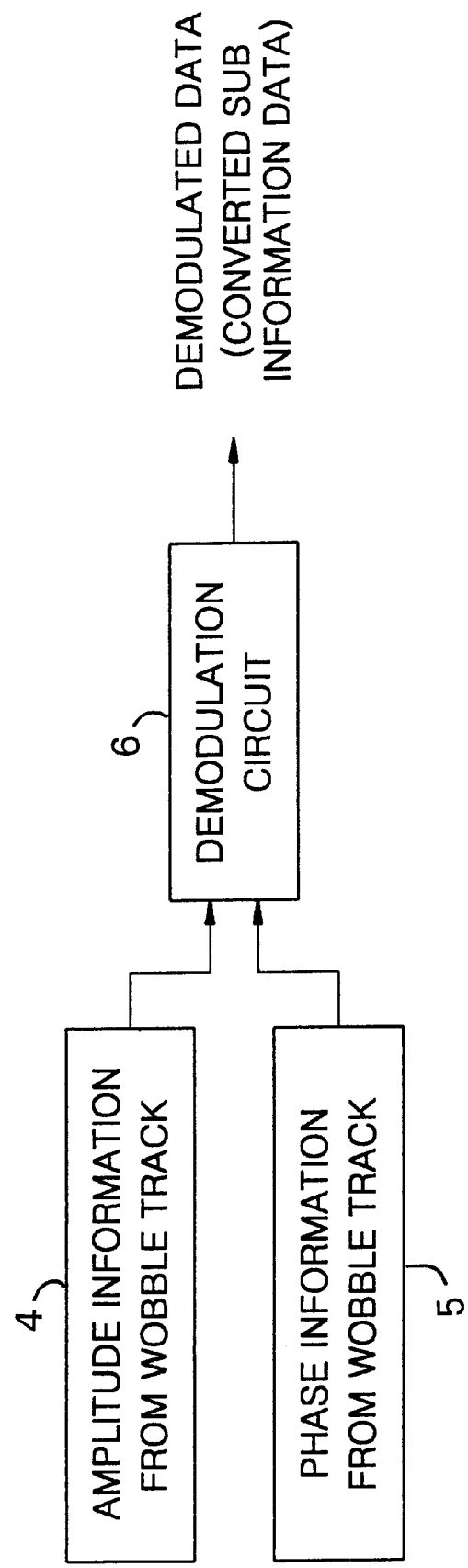
FIG. 8 is a block diagram for explaining the operation of specifying the converted sub information data from both amplitude information and phase information from the wobble track.

Additionally, to specify the converted sub information data from wobble by the modulation of the present invention, as shown in FIG. 8, amplitude information 4 from a wobble track (information on the length of a wobble section or a non wobble section), and phase information 5 from the wobble track (information on phase in the wobble section), are synthesized by a demodulation circuit 6. The converted sub information data can be specified based on both of the amplitude information 4 and phase information 5.

The wobble portion AWT and the non wobble portion NWT are formed at track recess T of the optical disc P1 and the wobble track WT1 is formed by the modulation method of the present invention, for example, the MAM modulation mixed with the PM modulation.

Alternatively, the length of the wobble section (A0 or A1) is not limited to 10 periods or 14 periods, but can be arbitrarily set to a desired number of periods. Also, the phase difference between the wobble section A0 in the converted sub information data form "0" and the wobble section A1 in the converted sub information data form "1" is not limited to 180°, but can be arbitrarily set to the desired phase difference.

The MAM modulation method constituting part of the modulation of the present invention uses OOK (on off keying) which is a digital modulation type of the AM (amplitude) modulation and is an improved AM modulation type which can be applied to the physical format of the optical disc of the present invention. Modulation signals by this type of modulation method are DC (direct current) free and very useful.

Additionally, in the MAM modulation method, "0" and "1" are represented by the presence of a wobble (wave). That is, since "0" and "1" are distinguished by the length of a section where the wobble continues, there is no need to change the frequency of the wobble, unlike the conventional FM modulation method. Further, in the conventional FM modulation method, a high C/N (carrier to noise) ratio is required to detect the frequency of the wobble. In contrast, according to the MAM.modulation method, since the detection of the existence of the wobble is simply required, a high C/N ratio is not needed. Further, in the MAM modulation method, it is possible to make the length of the non wobble section B0 included in "0" and the length of the non wobble section B1 included in "1" to be the same as in the this embodiment of the present invention. That is, in the present embodiment, B0=B1=the length of 2 periods of wobble. Thus, since there is no need to change the length of the non wobble section according to the value of the converted sub information data which may be "0" and "1," only the length of the wobble section needs to be changed so that an optical disc can be more simply realized. To read the wobble, the length of the non wobble sections B0 and B1 is preferably set as long as 1 or 2 periods of the wobble considering the effect to a PLL circuit in synchronization with the wobble. However, since this setting is determined according to a system to which the present invention is applied, the present invention is not limited to the setting value.

Since the present invention includes the conversion table and the MAM modulation, all converted sub information data have the same lengths on tracks. That is, the length of the waveform indicating each of bits "0" and "1" constituting the converted sub information data is different from each other so that the lengths on the tracks are different. However, since the converted sub information data is necessarily formed of 4 bits and includes the same numbers of bits "0" and "1," any value of the converted sub information data has the same length on the track of 4 bits. Thus, the length of the converted sub information data on the track can be formed the same so that control of recording data is simplified.

Additionally, although the length of the non wobble section B0 included in bit "0" of the converted sub information data and the length of the non wobble section B1 included in bit "1" of the converted sub information data are the same in this embodiment, even when the length of these non wobble sections are made to be different and the difference in the length of the non wobble section is used in identifying bits, the length of the converted sub information data for 4 bits does not change. That is, the conversion table converts 2 bits sub information data to 4 bits converted sub information data. When any sub information data is converted, the ratio of the occurrence of bit "0" and bit "1" in the converted sub information data after conversion is 1:1.

Figure 9A:
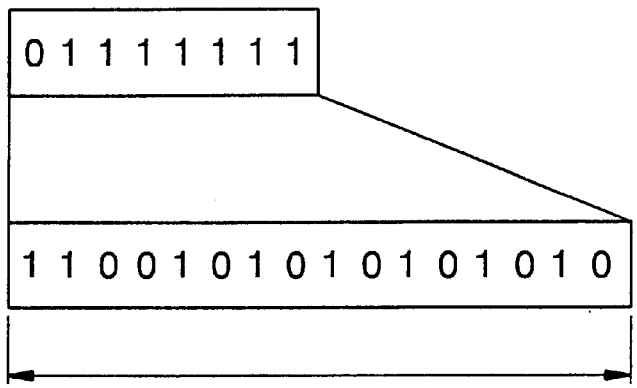
FIGS. 9A and 9B are views showing an example of conversion from the sub information data to the converted sub information data.
Figure 9B:
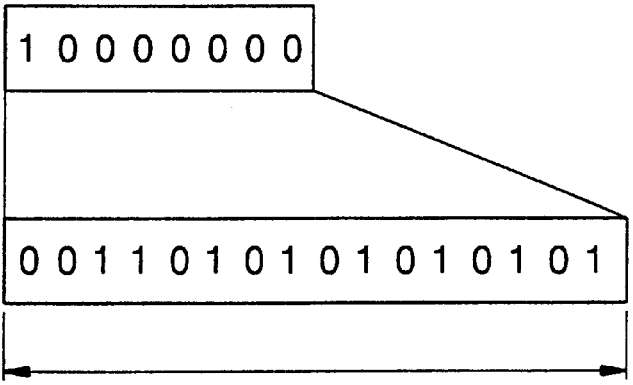

FIGS. 9A and 9B show an example of the conversion from the sub information data to the converted sub information data. When sub information data is formed of 8 bits, as shown in FIGS. 9A and 9B, converted sub information data after converting the sub information data by using the conversion table becomes 16 bits. Further, 8 bits of the 16 bits are "0" while the other bits are "1." More specifically, in example 1, as illustrated in FIG. 9A, 8 bits sub information data (01111111) are converted to 16 bits converted sub information data (1100101010101010) by the conversion table shown in FIG. 4. That is, the first 2 bits (01) of the sub information data are converted to 4 bits (1100) of the converted sub information data and the subsequent 2 bits (11) of the sub information data are sequentially converted to 4 bits (1010) of the converted sub information data, by the conversion table of FIG. 4. When the total length of the converted sub information data bit stream is represented by units of the wobble period Td, the total length $$\text{the total length} = \text{the length of "0"} + \text{the length of "1"}$$
$$= 8 \text{ bits} \times (10 \text{ Td} + 2 \text{ Td}) + 8 \text{ bits} \times (14 \text{ Td} + 2 \text{ Td})$$
$$= 224 \text{ Td}.$$

In example 2, as illustrated in FIG. 9B, 8 bits sub information data (10000000) are converted to 16 bits converted sub information data (0011010101010101) by the conversion table shown in FIG. 4. That is, the first 2 bits (10) of the sub information data are converted to 4 bits (0011) of the converted sub information data and the subsequent 2 bits (00) of the sub information data are sequentially converted to 4 bits (0101) of the converted sub information data, by the conversion table of FIG. 4. When the total length of the converted sub information data bit stream is represented by units of the wobble period Td, the total length $$\text{the total length} = \text{the length of "0"} + \text{the length of "1"}$$
$$= 8 \text{ bits} \times (10 \text{ Td} + 2 \text{ Td}) + 8 \text{ bits} \times (14 \text{ Td} + 2 \text{ Td})$$
$$= 224 \text{ Td, which is the same length as in the example 1}.$$

Therefore, the length on a track to express one sub information is always uniform, which is very useful in realization of the optical disc according to the present invention.

Figure 10:
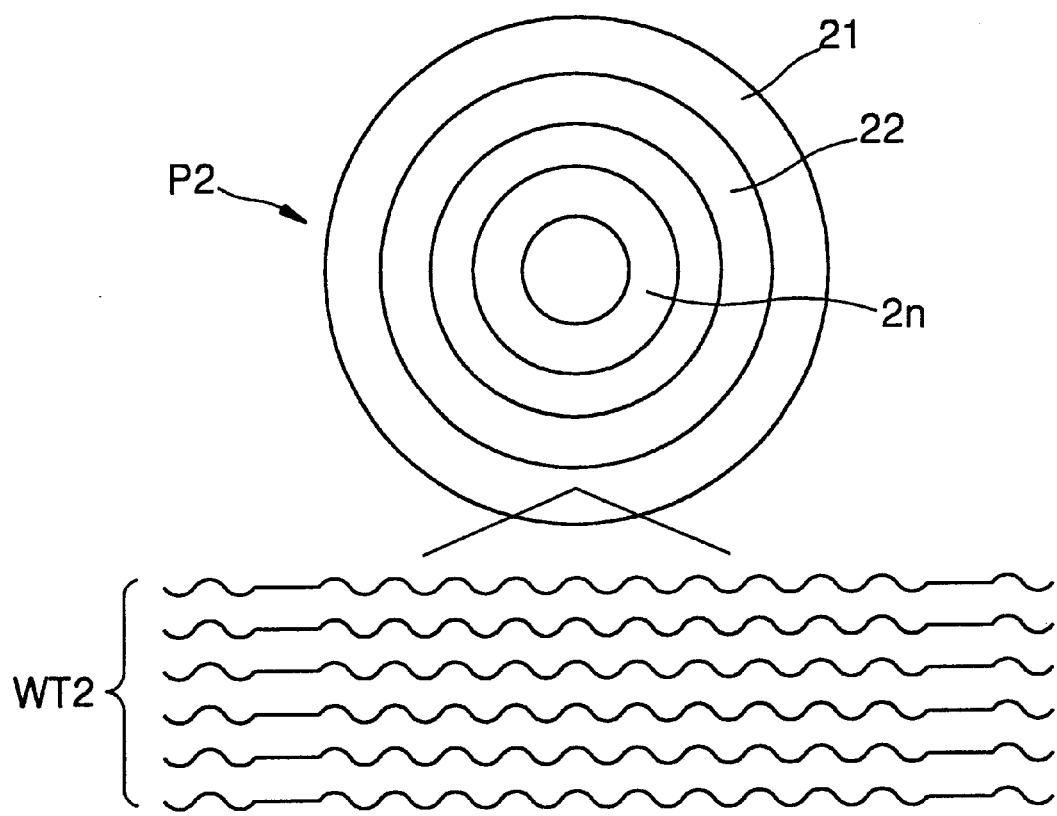
FIG. 10 is a view showing the structure of an optical disc P2 according to another embodiment of the present invention.

FIG. 10 shows an optical disc P2 according to another embodiment of the present invention. Referring to the drawing, Wobble track WT2 provided on the surface of the optical disc P2 is divided into a plurality of zones 21, 22, . . . , 2n. Also, the optical disc P2 is formatted by ZCAV (zoned constant angular velocity) or ZCLV (zoned constant linear velocity). In the optical disc P2, as sub information, a zone address of each of zones 21, 22, . . . , 2n is recorded on a wobble track belonging to each zone. That is, since the same zone addresses are recorded on all wobble tracks in the same zone, any adjacent track in the same zone records the same zone address. Thus, the phases of wobble of the adjacent wobble tracks WT2 are almost consistent.

In the optical disc having the above structure, even when wobble (wave) exists on a track, a uniform track pitch can always be obtained so that a wobble type and a land/groove recording type can be used together. The wobble can also be detected from an adjacent track without cross talk. Further, when all of A0, B0, A1 and B1 are set to be integer multiples of the period Td of wobble as in the above embodiment, the disc can be easily made and a PLL control system in an apparatus for reading the wobble can be stably operated.

According to the present invention, a logic value of each of the bits constituting the sub information is represented by a pair of the wobble portion and the non wobble portion. Also, since the phase of wave in the wobble portion when a bit is a logical value of "0" is different from the phase of wave in the wobble portion when the bit is a logical value of "1," and the no wobble portion is inserted between the wobble portions having different phases, the phase difference of the wobble portion can be clearly detected. Thus, very reliable sub information detection is possible.

If the phase of wave in the wobble portion when a bit is a logic value of "0" is set to be different from the phase of wave in the wobble portion when the bit is a logic value of "1," and if the length of any one of the wobble portion and the non wobble portion is different when a bit is a logical value of "0" or "1" (since amplitude information, that is, the length of the wobble portion or the non wobble portion, and the phase information, that is, the phase of a wave in the wobble portion, and the sub information from both information may be specified), very reliable detection of sub information is available.

Further, since an area for indicating address information is not specially needed in a disc format when an address in a track is recorded on the track of an optical disc as sub information, a very highly efficient disc format can be provided.

In addition, when the difference between the phase of wave in the wobble portion in the case in which a bit is a logic value of "0" and the phase of wave in the wobble portion in the case in which a bit is a logic value of "1" is set to be about 180°, the structure of the track recess forming the wobble portion and the non wobble portion can be simplified and a disc can be easily manufactured. Thus, manufacturing a disc is made easy and also reliability in detecting sub information can be improved Further, at the transition points from the wobble portion to the non wobble portion and from the non wobble portion to the wobble portion, when the phase of wave in the wobble portion is set to a predetermined phase, the structure of the track recess being formed into the wobble portion and the non wobble portion is simplified and manufacturing of the discs is made easy.

Further, when the lengths of the wobble portion and the non wobble portion are set to integer multiples of one period of wave in the wobble portion, the structure of the track recess being formed into the wobble portion and the non wobble portion is very simplified and manufacturing of the discs is made very easy. When a PLL control system is configured based on the wobble signal, the PLL control system can be stably maintained.

Further, when a track of the optical disc of the present invention is divided into a plurality of zones in a radial direction of the optical disc, the present invention can be applied to the ZCAV or ZCLV format.

Further, when a zone address of a zone is recorded on a track of the optical disc of the present invention as sub information, the present invention can be applied to a method in which the zone address is formed together with user data in each zone on the disc.

Further, when the phases of waves of the wobble portions of the adjacent tracks in a zone on an optical disc of the present invention are set to be consistent, since a track pitch in each zone can always be uniform, the wobble can be detected from the adjacent track without cross talk.

Although preferred embodiments of the present invention have been shown and described, it will be appreciated by those skilled in the art that changes may be made in these embodiments without departing from the principle and spirit of the invention, the scope of which is defined in the appended claims and their equivalents.

What is claimed is:

1. An optical disc having tracks for recording user data comprising:
   tracks in which a wobble portion waved in a radial direction of the optical disc and a non wobble portion which is not waved are provided, sub information is recorded on the tracks using a combination of the wobble portion and the non wobble portion, a logic value of each bit of information is represented by a pair of the wobble portion and the non wobble portion, and a phase of wave in the wobble portion when a bit is a logic value of "0" and a phase of wave in the wobble portion when the bit is a logic value of "1" are different.

2. The optical disc as claimed in claim 1, wherein a length of one of the wobble portion and the non wobble portion is different when the bit is a logic value of "0" and a logic value of "1".

3. The optical disc as claimed in claim 2, wherein the lengths of the wobble portion and the non wobble portion are set to integer multiples of one period of wave in the wobble portion.

4. The optical disc as claimed in claim 3, wherein each of the tracks is divided into a plurality of zones in a radial direction of the optical disc.

5. The optical disc as claimed in claim 4, wherein the sub information comprises zone addresses of the zones.

6. The optical disc as claimed in claim 5, wherein the phases of waves of the wobble portions of adjacent tracks in the zone are consistent.

7. The optical disc as claimed in claim 4, wherein the phases of waves of the wobble portions of adjacent tracks in the zone are consistent.

8. The optical disc as claimed in claim 2, wherein each of the tracks is divided into a plurality of zones in a radial direction of the optical disc.

9. The optical disc as claimed in claim 8, wherein the sub information comprises zone addresses of the zones.

10. The optical disc as claimed in claim 9, wherein the phases of waves of the wobble portions of adjacent tracks in the zone are consistent.

11. The optical disc as claimed in claim 8, wherein the phases of waves of the wobble portions of adjacent tracks in the zone are consistent.

12. The optical disc as claimed in claim 1, wherein the sub information comprises addresses of the tracks.

13. The optical disc as claimed in claim 12, wherein the lengths of the wobble portion and the non wobble portion are set to integer multiples of one period of wave in the wobble portion.

14. The optical disc as claimed in claim 13, further comprising a plurality of zones in a radial direction of the optical disc, each zone comprising a plurality of the tracks.

15. The optical disc as claimed in claim 14, wherein the sub information comprises zone addresses of the zones.

16. The optical disc as claimed in claim 15, wherein the phases of waves of the wobble portions of adjacent tracks in the zone are consistent.

17. The optical disc as claimed in claim 14, wherein the phases of waves of the wobble portions of adjacent tracks in the zone are consistent.

18. The optical disc as claimed in claim 12, further comprising a plurality of zones in a radial direction of the optical disc, each zone comprising a plurality of the tracks.

19. The optical disc as claimed in claim 18, wherein the sub information comprises zone addresses of the zones.

20. The optical disc as claimed in claim 19, wherein the phases of waves of the wobble portions of adjacent tracks in the zone are consistent.

21. The optical disc as claimed in claim 18, wherein the phases of waves of the wobble portions of adjacent tracks in the zone are consistent.

22. The optical disc as claimed in claim 1, wherein a difference between the phase of wave in the wobble portion in the case in which the bit is the logic value of "0" and the phase of wave in the wobble portion in the case in which the bit is the logic value of "1" is set to be about 180°.

23. The optical disc as claimed in claim 22, wherein the lengths of the wobble portion and the non wobble portion are set to integer multiples of one period of wave in the wobble portion.

24. The optical disc as claimed in claim 23, further comprising a plurality of zones in a radial direction of the optical disc, each zone comprising a plurality of the tracks.

25. The optical disc as claimed in claim 24, wherein the sub information comprises zone addresses of the zones.

26. The optical disc as claimed in claim 25, wherein the phases of waves of the wobble portions of adjacent tracks in the zone are consistent.

27. The optical disc as claimed in claim 24, wherein the phases of waves of the wobble portions of adjacent tracks in the zone are consistent.

28. The optical disc as claimed in claim 22, further comprising a plurality of zones in a radial direction of the optical disc, each zone comprising a plurality of the tracks.

29. The optical disc as claimed in claim 28, wherein the sub information comprises zone addresses of the zones.

30. The optical disc as claimed in claim 29, wherein the phases of waves of the wobble portions of adjacent tracks in the zone are consistent.

31. The optical disc as claimed in claim 28, wherein the phases of waves of the wobble portions of adjacent tracks in the zone are consistent.

32. The optical disc as claimed in claim 1, wherein, at transition points from the wobble portion to the non wobble portion and from the non wobble portion to the wobble portion, the phase of wave in the wobble portion is set to a predetermined phase.

33. The optical disc as claimed in claim 32, wherein the lengths of the wobble portion and the non wobble portion are set to integer multiples of one period of wave in the wobble portion.

34. The optical disc as claimed in claim 4, further comprising a plurality of zones in a radial direction of the optical disc, each zone comprising a plurality of the tracks.

35. The optical disc as claimed in claim 34, wherein the sub information comprises zone addresses of the zones.

36. The optical disc as claimed in claim 35, wherein the phases of waves of the wobble portions of adjacent tracks in the zone are consistent.

37. The optical disc as claimed in claim 34, wherein the phases of waves of the wobble portions of adjacent tracks in the zone are consistent.

38. The optical disc as claimed in claim 32, further comprising a plurality of zones in a radial direction of the optical disc, each zone comprising a plurality of the tracks.

39. The optical disc as claimed in claim 38, wherein the sub information comprises zone addresses of the zones.

40. The optical disc as claimed in claim 39, wherein the phases of waves of the wobble portions of adjacent tracks in the zone are consistent.

41. The optical disc as claimed in claim 38, wherein the phases of waves of the wobble portions of adjacent tracks in the zone are consistent.

42. The optical disc as claimed in claim 1, wherein the lengths of the wobble portion and the non wobble portion are set to integer multiples of one period of wave in the wobble portion.

43. The optical disc as claimed in claim 42, further comprising a plurality of zones in a radial direction of the optical disc, each zone comprising a plurality of the tracks.

44. The optical disc as claimed in claim 43, wherein the sub information comprises zone addresses of the zones.

45. The optical disc as claimed in claim 44, wherein the phases of waves of the wobble portions of adjacent tracks in the zone are consistent.

46. The optical disc as claimed in claim 43, wherein the phases of waves of the wobble portions of adjacent tracks in the zone are consistent.

47. The optical disc as claimed in claim 1, further comprising a plurality of zones in a radial direction of the optical disc, each zone comprising a plurality of the tracks.

48. The optical disc as claimed in claim 47, wherein the sub information comprises zone addresses of the zones.

49. The optical disc as claimed in claim 48, wherein the phases of waves of the wobble portions of adjacent tracks in the zone are consistent.

50. The optical disc as claimed in claim 47, wherein the phases of waves of the wobble portions of adjacent tracks in the zone are consistent.

51. An optical disc comprising:
   tracks having wobble portions and non wobble portions waved in a radial direction of the optical disc, each bit of sub information stored on the disc is represented by one of the wobble portions and one of the non wobble portions, and
   wherein user data and the sub information are overlapped on the tracks.

52. The optical disk according to claim 51, wherein the sub information is recorded on the tracks by a combination of the wobble portions and the non wobble portions.

53. The optical disk according to claim 51, wherein the optical disc is one of a rewritable DVD-RAM disc or a CD-RW disc using a phase change medium, a MO disc using a magneto-optical medium, or a write-once type optical disc such as a CD-R disc using a pigment based medium.

\* \* \* \* \*